United States Patent
Rokui et al.

(10) Patent No.: US 9,948,621 B2
(45) Date of Patent: Apr. 17, 2018

(54) POLICY BASED CRYPTOGRAPHIC KEY DISTRIBUTION FOR NETWORK GROUP ENCRYPTION

(71) Applicant: ALCATEL-LUCENT CANADA, INC., Ottawa (CA)

(72) Inventors: Mohammad Reza Rokui, Ottawa (CA); Rajesh Kumar Paida, Ottawa (CA); Carl Rajsic, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 131 days.

(21) Appl. No.: 14/717,681

(22) Filed: May 20, 2015

(65) Prior Publication Data

US 2016/0344711 A1    Nov. 24, 2016

(51) Int. Cl.
*H04L 9/08* (2006.01)
*H04L 29/06* (2006.01)

(52) U.S. Cl.
CPC .......... *H04L 63/061* (2013.01); *H04L 9/0833* (2013.01); *H04L 9/0891* (2013.01); *H04L 63/062* (2013.01); *H04L 63/065* (2013.01); *H04L 63/0853* (2013.01)

(58) Field of Classification Search
CPC .... H04L 63/06–63/068; H04L 9/0816–9/0894
See application file for complete search history.

(56) References Cited

U.S. PATENT DOCUMENTS

| | | | |
|---|---|---|---|
| 6,178,244 B1 * | 1/2001 | Takeda | H04L 9/0822 380/259 |
| 6,295,361 B1 * | 9/2001 | Kadansky | H04L 29/06 380/273 |
| 2005/0008001 A1 * | 1/2005 | Williams | H04L 12/2602 370/352 |

(Continued)

FOREIGN PATENT DOCUMENTS

| | | | |
|---|---|---|---|
| KR | 20020065979 A | * | 8/2002 |
| WO | 2014110680 | | 1/2014 |

OTHER PUBLICATIONS

T. Hardjono et al., "The Multicast Group Security Architecture-Network Working Group, Request for Comments: 3740", Mar. 2004.*

*Primary Examiner* — Lisa Lewis
*Assistant Examiner* — Zhimei Zhu
(74) *Attorney, Agent, or Firm* — Kramer & Amado, P.C.

(57) ABSTRACT

Various embodiments include a method for managing a group of devices in communication with each other and sharing a set of keys. The method may include opening a secure channel with each of two devices from the group; providing the set of keys to the two devices from the group, wherein the set of keys include an encryption and an authentication key; indicating to the two devices to begin using the set of keys; and performing an audit process including verifying that nodes within a key group have the same copy of encryption and authentication keys. Embodiments of the method may include synchronization, active/

(Continued)

standby redundancy and the ability to manage the network when some nodes perform the data encryption and some node do not, do, or when both encrypted and non-encrypted tunnels and services can work together.

20 Claims, 9 Drawing Sheets

(56) References Cited

U.S. PATENT DOCUMENTS

| | | | |
|---|---|---|---|
| 2005/0018853 A1* | 1/2005 | Lain | H04L 9/0836 380/277 |
| 2006/0120532 A1* | 6/2006 | Kean | H04L 9/085 380/277 |
| 2007/0016663 A1* | 1/2007 | Weis | G06F 11/2028 709/223 |
| 2009/0304003 A1 | 12/2009 | Huynh Van et al. | |
| 2013/0117563 A1 | 5/2013 | Grabelkovsky | |
| 2013/0294284 A1* | 11/2013 | Popa | H04L 63/065 370/254 |
| 2014/0208094 A1 | 7/2014 | Rajsic et al. | |
| 2015/0010152 A1 | 1/2015 | Proulx et al. | |
| 2015/0271145 A1* | 9/2015 | Jalisatgi | H04L 63/0428 713/168 |
| 2015/0278811 A1* | 10/2015 | Lalchandani | G06Q 20/40 705/42 |
| 2015/0336005 A1* | 11/2015 | Melnick | A63F 13/73 463/29 |
| 2016/0157113 A1* | 6/2016 | Row, II | H04W 84/18 370/252 |

\* cited by examiner

POLICY BASED CRYPTOGRAPHIC KEY DISTRIBUTION FOR NETWORK GROUP ENCRYPTION

TECHNICAL FIELD

Various embodiments disclosed herein relate generally to data networks and more specifically cryptographic methods in networking.

BACKGROUND

Network group encryption is becoming more prevalent in networks where several nodes must communicate with each other securely. Markets such as power utilities, government sector, transport and public sector frequently look toward network operators to provide solutions to create and manage secured communication within a loop. In certain industries, regulators are making security mandatory in certain strategic industries. The United States Congress, for example is requiring energy companies to increase investments in cyber security to protect evolving smart grids.

SUMMARY

A brief summary of various embodiments is presented. Some simplifications and omissions may be made in the following summary, which is intended to highlight and introduce some aspects of the various embodiments, but not to limit the scope of the invention. Detailed descriptions of an embodiment adequate to allow those of ordinary skill in the art to make and use the inventive concepts will follow in later sections.

Various embodiments relate to a method for managing a group of devices in communication with each other and sharing a set of keys. The method may include opening a secure channel with each of two devices from the group; providing the set of keys to the two devices from the group, wherein the set of keys include an encryption and an authentication key; indicating to the two devices to begin using the set of keys; and performing an audit process including verifying that nodes within a key group have the same copy of encryption and authentication keys.

Various embodiments relate a device for managing a key group. The device may include a memory; a processor in communication with the memory, the processor configured to: open a secure channel with each of two devices from the group; provide the set of keys to the two devices from the group, wherein the set of keys include an encryption and an authentication key; indicate to the two devices to begin using the set of keys; and perform an audit process including verifying that nodes within a key group have the same copy of encryption and authentication keys.

Various embodiments relate a method for managing a group of devices in communication with each other and sharing a set of keys. The method may include, opening a secure channel with each of two devices from the group; providing the set of keys to the two devices from the group, wherein the set of keys include an encryption and an authentication key; indicating to the two devices to begin using the set of keys; and performing synchronization procedures including detecting when a key group is modified inside one of the routers.

Various embodiments relate to a device for managing a key group. The device may include: a memory; a processor in communication with the memory, the processor configured to: open a secure channel with each of two devices from the group; provide the set of keys to the two devices from the group, wherein the set of keys include an encryption and an authentication key; indicate to the two devices to begin using the set of keys; and perform synchronization procedures including detecting when a key group is modified inside one of the routers.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
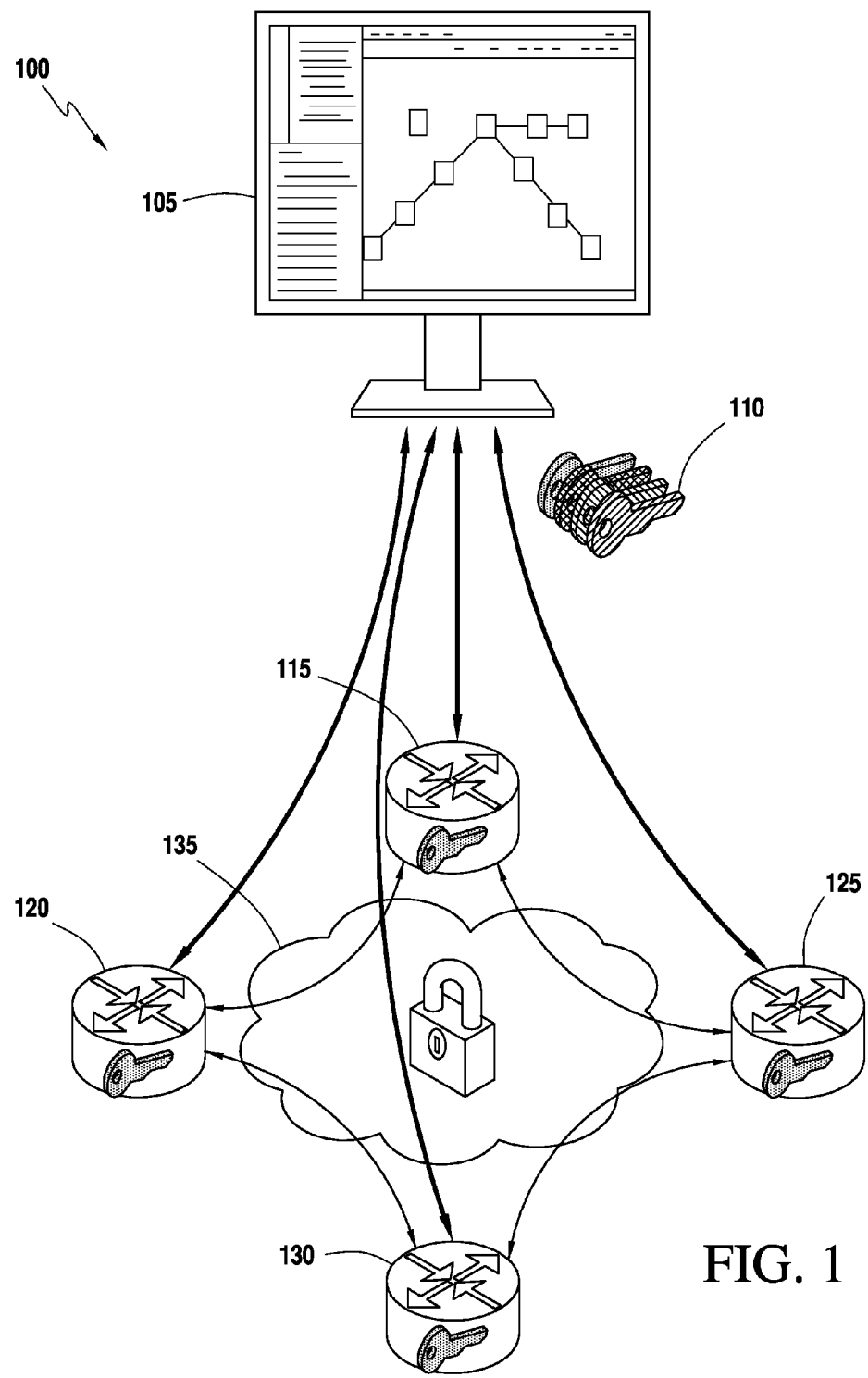
FIG. 1 illustrates a key distribution environment embodiment.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Migrating mission critical services from Time Division Multiplexing (TDM) and legacy services to Internet Protocol is moving slowly. Transport of legacy services over Multi-Protocol Label Switching (IP/MPLS) versus a direct cutover to IP is often preferred. Securing this traffic's integrity, confidentiality and authenticity are now being mandated. MPLS is sometimes recognized as the leading technology for such transport. Traditional encryption techniques have challenges for providing this function for all types of services such as Layer 2 (L2) and other MPLS services such as Virtual Private LAN Service (VPLS), Virtual Leased Lines (VLLs), and tunnels. Group based approaches are sometimes preferred due to ease of configuration and management. In group based approaches, it may be unnecessary to configure large numbers of encryption tunnels each with different encryption keys with neighboring peers.

The security of IP and MPLS communication is an important component of today's networks which can support applications such as voice, video and data infrastructures. Virtual Private Network (VPN) services security is a major concern for private networks, as data may pass through multiple transit networks some of which are not encrypted making such traffic more prone for sniffer attacks, where critical information may be compromised. Some examples of secure networks include health care, banking and power utilities smart grids. Secure communication prefers creation of secure tunnels, such as Internet Protocol Security (IPSec), between the network elements, which in turn desires the reliable and secure distribution of cryptographic keys (encryption and authentication keys) between network elements. These keys may be used to first create a secure control channel between network elements and then to create a secure data channel for traffic encryption.

As the number of VPNs grow in the network, managing these secure tunnels may become a bigger challenge for the network operator. Some embodiments described below address the reliable and robust cryptographic keys distribution in a large scale IP and MPLS network. These embodiments may also address the re-key mechanism to make sure the cryptographic keys are reassigned which in turn may guarantee the security of the data channel.

Two main building blocks to build a secure and reliable IP and MPLS communication include: the cryptographic key management whose responsibility is to distribute the cryptographic keys reliably; and the data path using the keys to encrypt and authenticate the data traffic.

Embodiments provide the ability to encrypt IP and MPLS based user traffic end-to-end without the need to manage meshes of secure tunnels at the network level. Secure tunnels may be achieved without using any protocol such as IPSec in the network. A service manager such as Alcatel™ Lucent's™ 5620 Service Aware Manager (SAM)™ may be used to manage distribution and management of keys among all nodes. The service manager may be responsible for managing the security of the transit links which the VPNs use to transfer data. Embodiments may include:
- a cryptographic encryption key service manager whose responsibility is to distribute the cryptographic keys reliably; and
- a data path using the keys to encrypt and authenticate the data traffic.

FIG. 1 illustrates a key distribution environment embodiment 100. Key distribution environment embodiment 100 may include service manager 105, keys 110, nodes 115, 120, 125 and 130, and network 135.

Group encryption processes may be integrated on a service manager 105. Group encryption may include service manager 105 defining a group of nodes, such as nodes 115, 120, 125 and 130, using a set of keys for secure communication among the nodes in the group. Service manager 105 may distribute the same authentication key as well as encryption key to each node of a key-group. Any type of network may be used for communication between nodes in a key-group. Network 135 may be an MPLS based, or IP network, for example.

The service manager 105 may act as a central cryptographic key manager for nodes of a key group. Service manager 105 may provide the keys for each key-group that are used to perform encryption and authentication within the group. The service manager 105 may ensure that all nodes in a key-group are kept in sync and that only those key-groups that are relevant to a particular node are downloaded with sensitive keys.

The service manager 105 may also provide the function of re-keying a key-group such that there is no outage time during a re-key procedure. Different key-groups may be rekeyed at different times if desirable, or can be all rekeyed network wide at the same time.

Service manager 105 may include a policy framework which may be used to perform the following functions: reliable cryptographic key distribution: key audit; and key synchronization. Service manager 105 may include a comprehensive policy engine to perform various types of policy functions. The policy engine may be enhanced to perform the functions of key management.

Communications between the service manager 105 and network elements such as nodes 115-130 may be accomplished through a secure communication means. For example, communications may be done using Secure Shell (SSH). Distributed keys may be used for securing any traffic, for example, IP or MPLS and any tunnel type such as IPSec, Generic Routing Encapsulation (GRE), IP-in-IP or any-to-any connectivity.

Operational flexibility and security may be extended through service manager 105 control features that allow administrators to assign operator privileges based on geography, organization, job function, or individual responsibilities. Embodiments may include the ability to deploy the service manager 105 in a high availability, geographically redundant configuration with high reliability. Similarly, the ability to deploy in geographically redundant configurations or environments may not require any modification on the part of the service manager 105. Cryptographic keys may be automatically generated in service manager 105. Similarly, cryptographic keys may be taken from an imported key file or assigned in real-time from a key distribution entity. Embodiments may maximize network up-time in the event of a network failure, for example, from a natural disaster. Key distribution environment embodiment 100 may support several service types such as Ethernet, Serial, TDM, L2 VPN, and Layer 3 (L3) VPN, for example.

Figure 2:
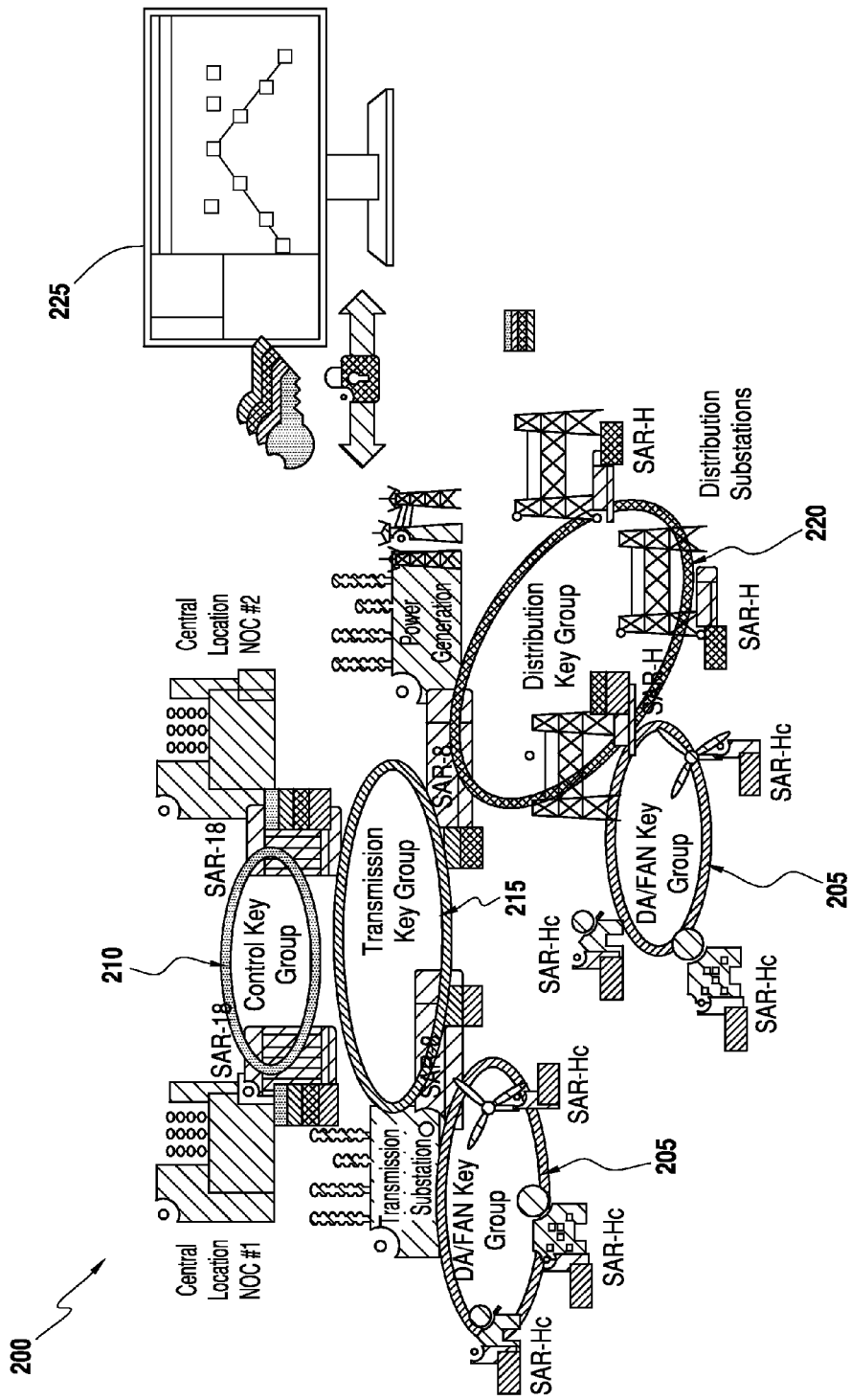
FIG. 2 illustrates managed key group environment embodiment.

FIG. 2 illustrates managed key group environment embodiment 200. Managed key group environment embodiment 200 may include FAN key group 205, control key group 210, transmission key group 215, distribution key group 220, and service manager 225. Embodiment 200 may include services of interest that require end to end encryption. Embodiment 200 may include encrypted MPLS services, for example. Key groups 205-220, may for example, contain servers, routers or nodes which include a holder of keys assigned to services enabling security services network partitioning. Each node may be a routing element which is capable of performing service encryption. Service manager 225 may act as the key distribution server for network-wide encrypted service. In some embodiments, key group partitions may provide another layer of security ensuring that only encrypted services associated with particular nodes may be accessible by those nodes.

In some embodiments, network manager 225 may provide configuration and management of encrypted services network wide. Network manager 225 may ensure pre-shared keys in a key-group are only sent to nodes with services using the associated key-group. Network manager 225 may maintain key synchronization across all nodes in the network. Similarly, network manager 225 may act as the network wide key server. Network manager 225 may provide hitless rekeying procedures using secure SSH sessions to each node, for example.

In some embodiments, SSH sessions may be opened, keys installed, and then the sessions closed. In some embodiments, new/old key coordination network wide may ensure hitless transition to new keys. Network manager 225 may provide login controls and procedures for user account control and separation for network operators, and network security personnel. In some embodiments, loss of connectivity to network manager 225 may not impact encrypted services.

In one embodiment, Service Distribution Points (SDP) Encryption may be used. For example, an MPLS user plane making use of SDPs for transport, Virtual Private Routed Network (VPRN) or Internet Enhanced Service (IES) services using spoke-SDPs, VPLS using spoke or mesh SDPs, routed VPLS into VPRN, E-pipes, and C-pipes. I-pipe, A-pipe, F-pipe, and H-pipe may also be considered. Tunnels, for example, may be either MPLS Label-Switched Path (LSP) Resource Reservation Protocol-Traffic Engineering (RSVP-TE), Label Distribution Protocol (LDP), static Label Switched Path or Generic Routing Encapsulation (GRE).

In another embodiment, VPRN Encryption may be used. This may include Multiprotocol Border Gateway Protocol based VPRN service. This may also include "auto-bind" using either Label Distribution Protocol (LDP), GRE, RSVP-TE, or MPLS (LDP or RSVP-TE).

In some embodiments encryption algorithms used may include Advanced Encryption Standard 128 or 256 (AES-128, and AES-256). Authentication algorithms used may include Hash Message Authentication code Secure Hash Algorithm (HMAC-SHA-256, and HMAC-SHA-512).

Figure 3:
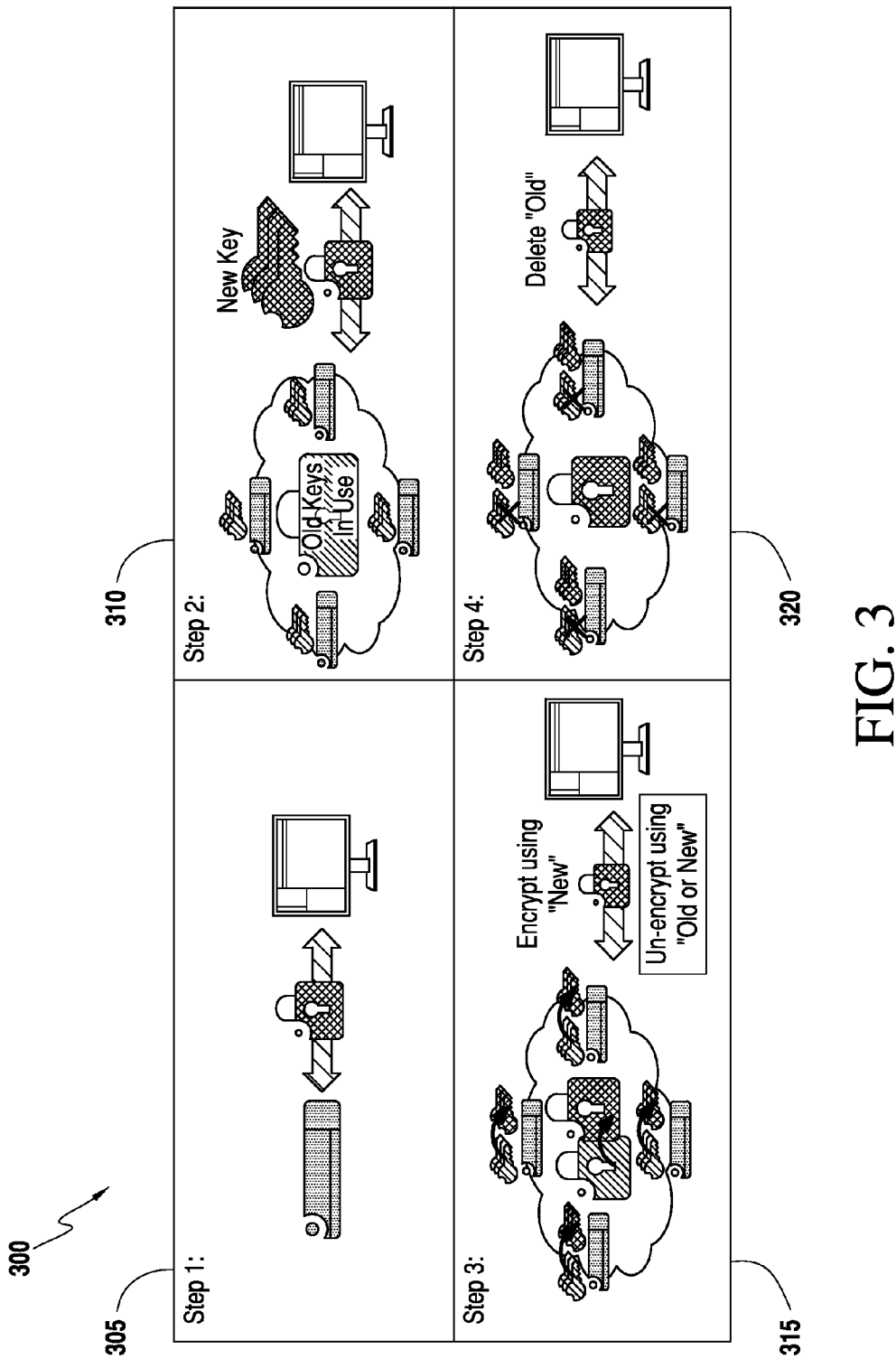
FIG. 3 illustrates a re-keying embodiment.

FIG. 3 illustrates a re-keying embodiment 300. Embodiment 300 may include step 1 305, step 2 310, step 3 315 and step 4 320.

In step 1 305 the service manager 105 may open a secure SSH session to a node which requires new keys. SSH may be used to download key values.

In step 2 310 service manager 105 may update keys on all nodes in the network and verify that all nodes have been updated and the network is synchronized with the new keys.

In step 3 315 service manager 105 may tell each node to start using the new keys. Both old and new keys may then be live and available for encryption and decryption.

In step 4 320 service manager 105 may confirm that all nodes are now using the new keys and delete the old keys from each node in the network.

The service manager 105 policy framework may be enhanced to perform the policy functions such as reliable cryptographic key distribution, key audit and key synchronization. The service manager 105 policy framework may be utilized to address a large number of network elements. The service manager 105 policy framework may also make sure the same cryptographic keys are distributed to all the network elements in a key group without introducing any new protocols such as Internet Key Exchange (IKE). The service manager 105 may use a combination of Simple Network Management Protocol (SNMP) v3 and SSH to manage and distribute the cryptographic keys, for example. The policy engine may perform the key audit process at a regular basis or on-demand to ensure the keys consistency and correctness network wide. All communications between the Key Manager and network elements may be done through SSH.

Service managers may maintain geographic redundancy where the same service or server may be instantiated in multiple data centers or on different nodes. The service manager's 105 geographic redundancy may occur without any new protocols and procedures. The service manager 105 geographic redundancy may be enhanced to make sure the key distribution is robust in case of an active service manager 105 failure. Upon recovery, the service manager 105 may perform a key audit to ensure the consistency and correctness of the cryptographic keys for the entire network.

The service manager 105 may be flexible such that it gets keys from different sources. The cryptographic keys may be auto-generated by service manager 105, taken from a key file imported to service manager 105, or assigned in real-time from a key distribution entity. All options may be used independently, for example, some key groups may use the imported keys whereas other key groups may use the auto-generated keys.

Figure 4:
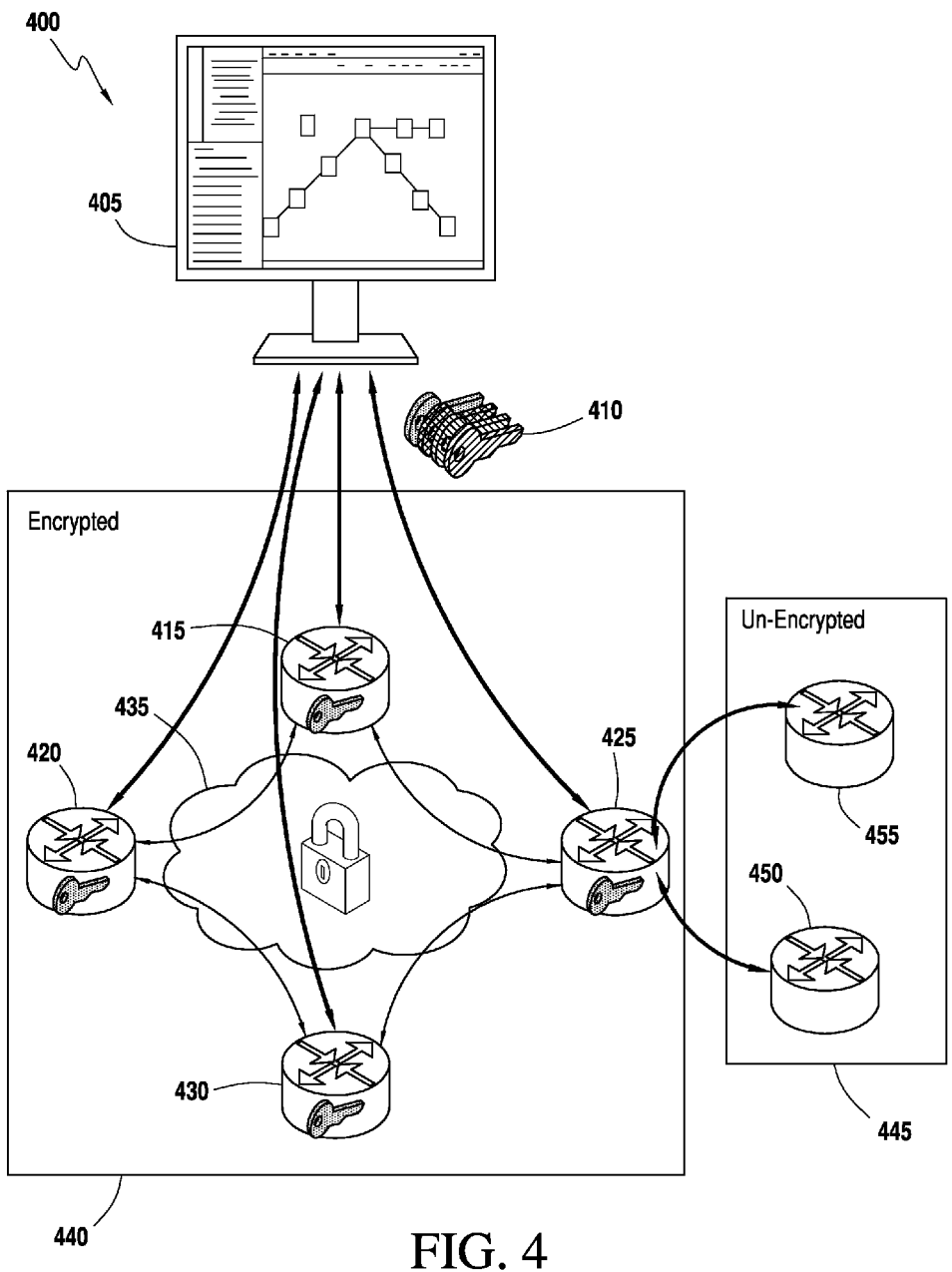
FIG. 4 illustrates a key group management embodiment.

FIG. 4 illustrates a key group management embodiment 400. Embodiment 400 may include service manager 405, keys 410, nodes 415, 420, 425 and 430, network 435, unencrypted routers 450 and 455, encrypted environment 440 and unencrypted environment 445.

Provisioning may be done by service manager 405. Service manager 405 may use, for example, SNMP v3 for provisioning of aspects of key group encryption. For example, provisioning may include key group creation and/or deletion, assignment of the key groups to tunnels such as SDP and services such as VPRN services.

The policy engine on service manager 405 may be enhanced to make sure the same key group is assigned to the routers inside one key group. Policy management may be accomplished using audit and/or synchronization procedures. Audit procedures may include ensuring when a key group is created in service manager 405, and distributed to all the routers inside a key group. Service manager 405 may ensure all the routers and/or nodes have exactly the same copy of encryption and authentication keys. Synchronization procedures may include when a key group is modified inside one of the routers, (by, for example, command line inside the router) making sure the discrepancy is detected proactively and proper action is taken. This may prevent packet drops and traffic loss in the network.

In one embodiment, a main channel for key distribution and key audit may be an SSH connection between service manager 405 and nodes. The service manager 405 may provide the two main functions when using key groups in a network, service configuration and key management. With knowledge of which nodes are providing which services, a service manager 405 may easily determine which nodes require which keys to be used in a security domain.

Pre-shared keys (PSK) may be generated internally on a service manager 405 using a strong random number generator that is provided by the operating system. When downloading keys to nodes, service manager 405 may open a new SSH session, for example, to each node and install the keys using a simple CLI command. The service manager 405 may use a default user Id or operator defined user ID specifically assigned for key updates. The ID may be easily tracked via normal accounting and logging methods associated with users for auditing purposes. The SSH sessions may protect the keys on transport using a strong AES256 encryption algorithm, and the nodes may store the keys internally in a secure manner. The service manager 405 may compute a simple CRC-32 checksum for each key in use. To make sure each node in the network has the correct set of keys, the service manager 405 may retrieve the CRC-checksum from the node on SSH channel and if all the nodes match the checksum value then the service manager 405 knows all the nodes are synchronized with the correct keys.

The service manager 405 may make sure that newly generated keys do not have CRC-32 collisions with the previous keys used, and if a collision is detected it skips to new key values that do not collide with the previous CRC-32 values.

For synchronization, a service manager 405 may provide two functions in a network such as Service configuration using SNMPv3 and Key management using SSH. Changes on the node (which may include keys, in case an operator changes the key manually) may be propagated to service manager 405 through SNMPv3 Notification, for example. When service manager 405 receives the notification, it knows that the key on the node has been modified. The service manager 405 may raise an alarm to indicate the changes to the operator. Similarly, it is an option in service manager 405 to re-distribute (i.e., Synchronize) the correct key to that specific node using SSH channel as described before. In this capacity, service manager 405 may proactively monitor all the Key Groups to make sure the network is healthy with correct keys to prevent data traffic packet loss.

When keys are assigned to all the nodes inside a key group, the service manager's 405 policy engine may use complex asynchronous logic to make sure the key distribution is scalable to a large number of routers, such as up to 50,000 routers.

The key distribution using service manager 405 policy engine may use the SSH connection between service manager 405 and a node. One of the advantages of using SSH in this manner is that it may provide an additional layer of security on top of the already considerably secure transport tunnels. A new SSH session may be opened on every key update and the pre-shared keys may be downloaded over an in-band communications channel. This results in additional security to key download. The service manager 405 may open the SSH channel to each node and download the keys during initial creation of a Key Group or during the re-keying procedure. To increase the scalability and performance, instead of opening the SSH channel to each node in the group one by one, a service manager 405 may measure the load on each node and based on that the measure load open SSH channels to multiple nodes at the same time. The service manager then distributes the keys on all those nodes and waits for their response. Since each node will independently respond to service manager 405, this operation is asynchronous and service manager 405 will coordinate the whole process of re-keying or initial creation.

Resiliency and redundancy of the service manager 405 may also be increased. The service manager 405 may include an active/standby architecture which is enhanced to make sure key distribution and re-key processes are robust and accurate at all times. Scalability may also be increased. In some embodiments, resiliency and redundancy logic in service manager 405 may be enhanced to make sure all the routers inside one key group have correct keys when one of the following situations is corrected:

a router such as one of routers 415-430, does not respond during the key distribution or re-key process;
the network 435 between service manager 405 or router is down; and/or
the active service manager 405 is down.

Redundancy between service manager 405 Server and Database applications may be used to ensure visibility of the managed network is maintained when one of the following failure scenarios occur: loss of physical network connectivity between service manager 405 Server and/or service manager 405 Database and the managed network; and hardware failure on a workstation hosting the service manager 405 Server and/or service manager 405 Database software component.

Service manager 405 may support redundancy of the service manager 405 Server and service manager 405 Database components in the following configurations, for example:

service manager 405 Server and service manager 405 Database collocated and redundant; and
service manager 405 Server and service manager 405 Database distributed and redundant In some scenarios it may be necessary that some router encrypts the data on some tunnels or services but does not encrypt the data on other tunnels. Any one of routers 415-430 may encrypt data within encrypted environment 450 but not for unencrypted environment 455, for example. In this scenario, service manager's 405 key distribution process may ensure the key distribution logic takes the separate environments into consideration. Otherwise when one of routers 415-430 encrypts data for all the tunnels, the unencrypted environment 455 may have total packet loss since one of routers 415-430 in encrypted environment 450 may encrypt the traffic but router 440-445 may be unable to decrypt. The logic may be considered for key distribution and re-key logic for all tunnels and services in the network similarly.

Figure 5A:
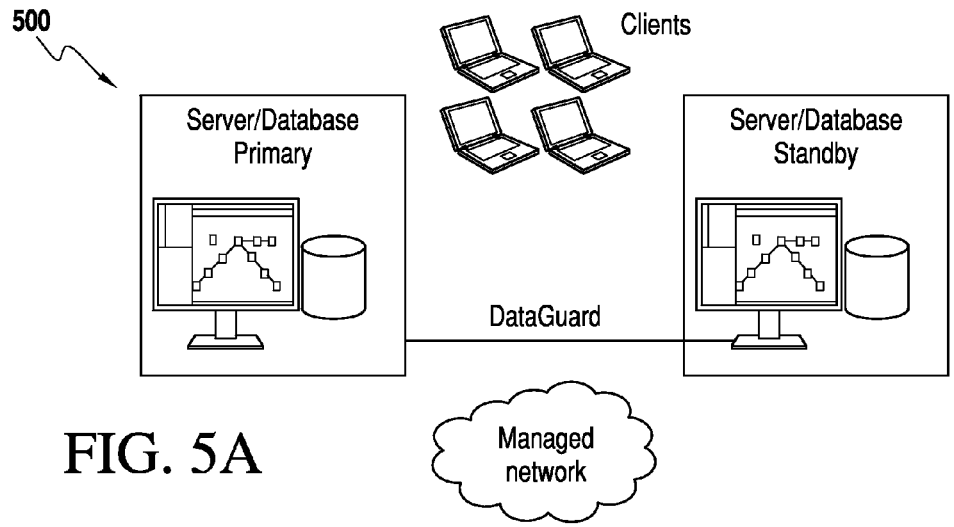
FIG. 5A illustrates collocated server/database redundancy deployment embodiment 500.
Figure 5B:
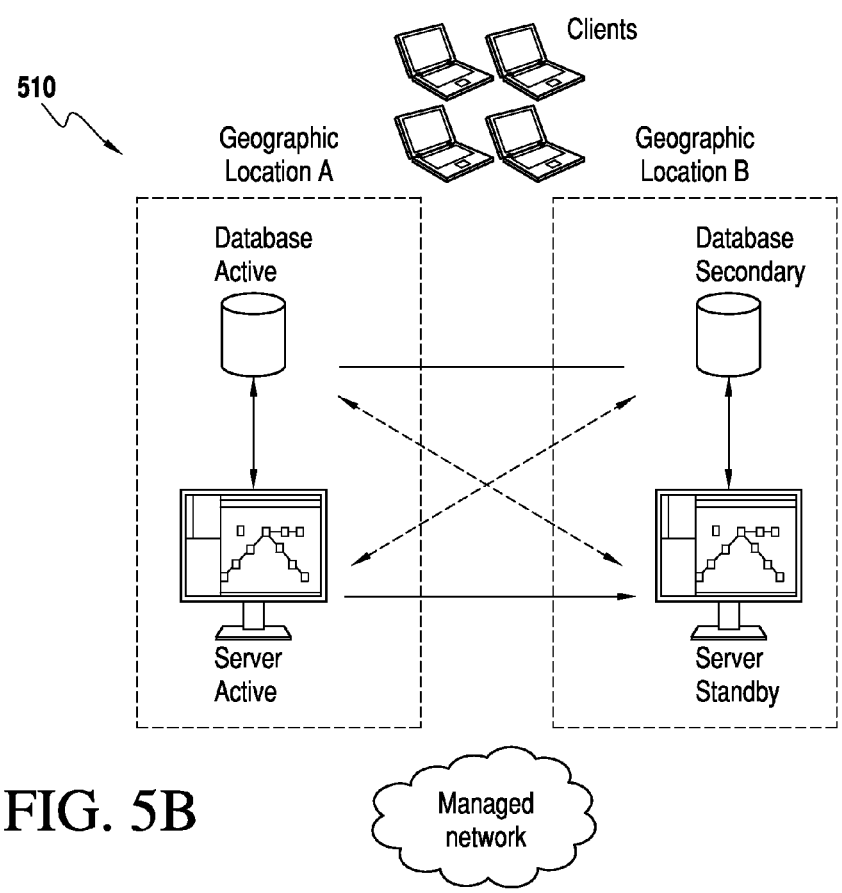
FIG. 5B illustrates distributed server/database redundancy deployment in a geographically redundant setup embodiment.

FIG. 5A illustrates collocated server/database redundancy deployment embodiment 500. FIG. 5B illustrates distributed server/database redundancy deployment in a geographically redundant setup embodiment 510.

FIG. 5A and FIG. 5B illustrate a service manager 405 redundant installation when the service manager 405 Server and service manager 405 Database components are installed in a collocated configuration. Both of these redundant configurations may be enhanced to make sure that if the activity switches between Primary and Standby Servers, the nodes have the correct keys. The switch between the primary and standby servers may happen during the initial creation of the Key Group or during the re-keying procedure. In either of these cases the state of the network is unknown since the re-keying procedure or Key Group creation has not been finished. As a result, it is extremely important to have a safe and robust procedure in SAM that after the switch so all the nodes have the same Key Group and same keys.

To achieve this, after a switch between the primary and standby servers, the newly active service manager 405 may audit all the Key Groups and all keys inside each Key Group to make sure the switch did not happen during re-keying procedure or Key Group creation. When the newly active service manager detects this situation, the newly active service manager will start with either the creation of Key Group or re-keying to the Key Group right away and may not wait for expiration of a re-keying timer.

To achieve this, service manager 405 Key Group creation may contain a logic to detect the above-mentioned scenario. Key group encryption may provide two main modes of operation for encrypting MPLS based services, for example, SDP level encryption and VPRN level encryption. When enabling key group encryption on node 425 for an SDP tunnel whose other end does not support key group encryption, for example, service manager 405 may detect this and may not allow to be added this SDP to the Key Group. Similarly when node 425 may be added to a VPRN service with auto-bind option, service manager 405 may make sure all the nodes (including node 425) support key group encryption. If not, service manager 405 may not allow the operator to be added this node to Key Group by blocking the transaction and transmitting an error.

In some embodiments keys may be locally encrypted and stored on nodes 415-430 in non-volatile memory. Non-volatile memory may include, for example, Read Only Memory (ROM), flash memory, ferroelectric Random Access Memory (F-RAM), magnetic computer storage such as hard disks. This encryption and storage mechanism may enable immediate and continuous encryption when a node recovers from a reset/reboot from an upgrade, for example. In some embodiments, this type of storage may enable continuous encrypted services during disaster events as all keys are available locally.

In some embodiments there may be no centralized point of failure or concern that communications to router based key servers become unavailable. In some embodiments, keys may not be viewed or retrieved via any management interface on the node via Command Line Interface or SNMP, for example. Keys may be verified using a retrievable checksum value to ensure key values are consistent between nodes. In some embodiments, loss of connectivity to service manager 405 may not impact encrypted services. Keys may remain intact until connectivity is re-established with the service manager 405 and the next re-key procedure is initiated.

Figure 6:
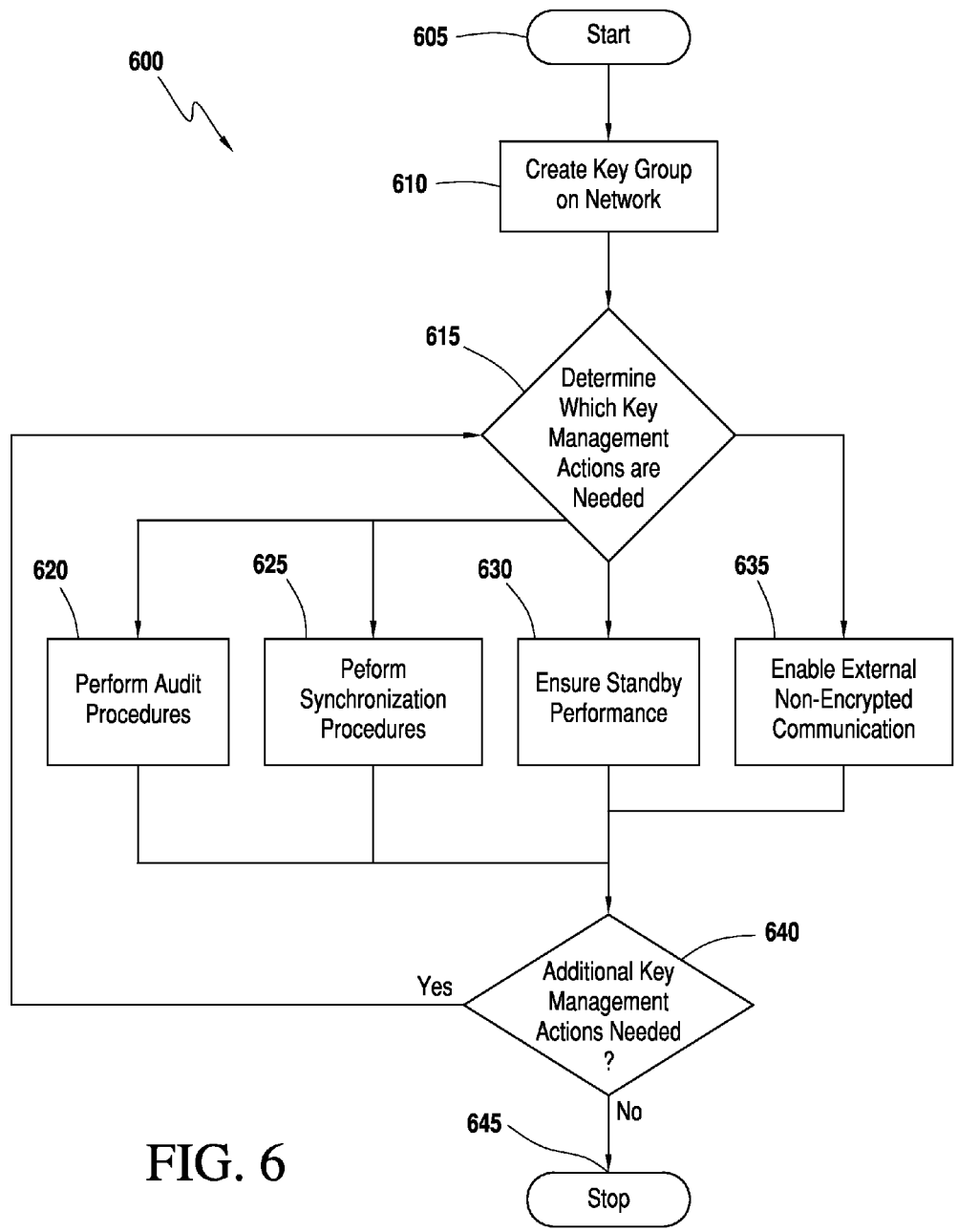
FIG. 6 illustrates a key group management process.

FIG. 6 illustrates a key group management process 600. In key group management process 600, service manager 105 may begin in step 605 and continue to step 610 where it may create a key group. Key group creation may take place as described in re-keying embodiment 300.

Service manager 105 may continue to step 615 where it may determine which key management actions are needed. In step 615, Service manager 105 may determine which of a variety of steps to take.

In one embodiment, service manager 105 may determine to proceed to step 620 where it may perform audit procedures. In performing audit procedures, service manager 105 may verify that all nodes or routers within a key group have the same exact copy of encryption and authentication keys. In some embodiments, the auditing may be done on a timer. The timer and/or scheduler may be set by a user or automatically via an interface. When done auditing, service manager 105 may proceed to step 640 where it may determine if additional key management actions are needed. When service manager 105 determines that additional key management actions are needed service manager 105 may proceed to step 615. When service manager 105 determines that additional key management actions are not needed service manager 105 may proceed to step 645 where it may stop.

Service manager 105 may determine to proceed from step 615 to step 625 where it may perform synchronization procedures. In step 625, service manager 105 may proactively detect if a key group is modified inside one of the routers. For example, the router may have been updated by command line. Service manager 105 may take the proper action when there is a detected change. When done performing synchronization procedures, service manager 105 may proceed to step 640 where it may determine if additional key management actions are needed. When service manager 105 determines that additional key management actions are needed service manager 105 may proceed to step 615. When service manager 105 determines that additional key management actions are not needed service manager 105 may proceed to step 645 where it may stop.

Service manager 105 may determine to proceed from step 615 to step 630 where it may ensure resilient standby performance. For example, when a router or node is non-responsive during a key distribution or re-key process service manager 105 may make sure all routers in one or each key group have the correct keys when the situation is completed. Similarly, when the network is down, or an active router is down, service manager 105 may make sure the routers in the associated key group have correct keys once the network or router is back up and running. When done ensuring standby performance, service manager 105 may proceed to step 645 640 where it may determine if additional key management actions are needed. When service manager 105 determines that additional key management actions are needed service manager 105 may proceed to step 615. When service manager 105 determines that additional key management actions are not needed service manager 105 may proceed to step 645 where it may stop.

Service manager 105 may determine to proceed from step 615 to step 635 when communication with routers outside of a key group is necessary. For example, service manager 105 may verify that routers in a key group may still communicate with routers outside the key group without encryption. When done ensuring external communication capabilities, service manager 105 may proceed to step 645 640 where it may determine if additional key management actions are needed. When service manager 105 determines that additional key management actions are needed service manager 105 may proceed to step 615. When service manager 105 determines that additional key management actions are not needed service manager 105 may proceed to step 645 where it may stop.

Figure 7:
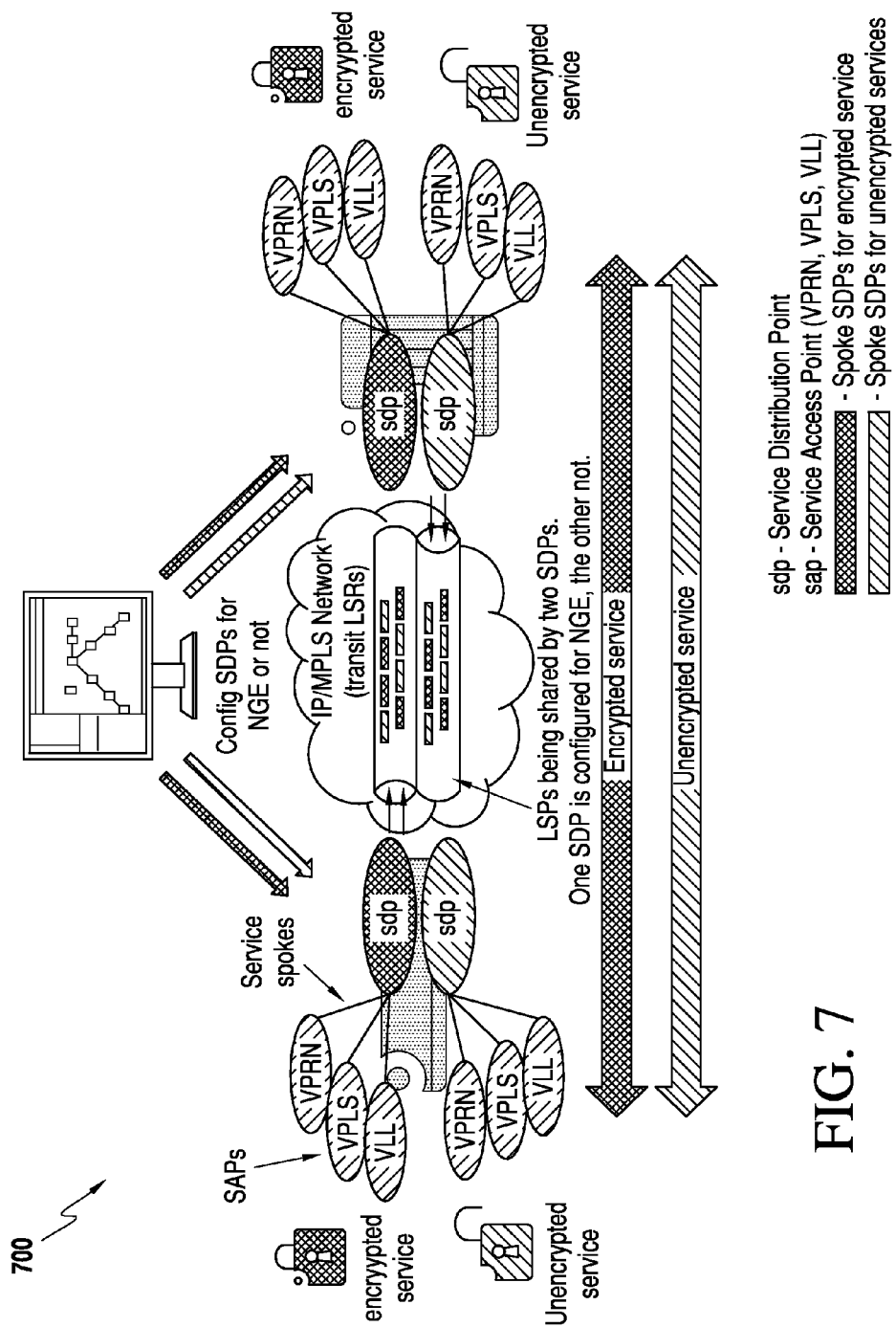
FIG. 7 illustrates Flexible Service Encryption of MPLS Based Traffic Over SDPs embodiment.

FIG. 7 illustrates Flexible Service Encryption of MPLS Based Traffic Over SDPs embodiment 700. Key group encryption may provide two modes of operation for encryption: SDP level encryption; and VPRN level encryption.

Some embodiments use SDPs for making configuration and management of MPLS based services easy and flexible. SDPs may be associated with tunneling MPLS LSPs which may include static LSPs, LDP LSPs, or RSVP-TE LSPs. In addition to MPLS based tunneling, GRE based tunnels may also be configured as SDPs for transport of MPLS based services over a Layer 3 IP networks. Multiple SDPs may share the same LSP.

Key group encryption may be configurable on the SDPs themselves by setting the key-group security domain that the SDP is to be associated with. Once the SDP has been configured with a key-group value, any SAPs that are configured for that SDP will have its traffic encrypted and authenticated using the keys and algorithms configured for that key-group. The service manager 105 may ensure that both routers associated with a particular SDP have the key-group information that enables key group encryption for the SDP.

In FIG. 7, the encrypted service has been configured with key group encryption since a key-group is configured on the SDP. Any VPRN, VPLS or VLL based service that is associated with the encrypted service will have its traffic encrypted over the transport LSPs for the encrypted service. It may be possible as well to have both encrypted and un-encrypted traffic share the same LSPs. The unencrypted service in FIG. 7 may not be configured with a key group encryption key-group, and therefore any VPRN, VPLS, or VLL based services that are configured with the unencrypted service would also not be encrypted. In this way transport LSPs can carry both encrypted and unencrypted services, possibly optimizing hardware dedicated for encryption to only traffic that requires the additional security. This adds a great deal of flexibility to the types of services that may be encrypted using key group encryption while minimizing the maintenance of the MPLS network since the LSPs and tunnels used for transport are not impacted or modified when enabling or disabling key group encryption.

The types of services that include MPLS based encryption include VPRNs or IES services that use spoke-SDPs, VPLS based services using spoke or mesh SDPs, Ethernet pseudo wires (E-pipes) and constant-bit rate pseudo wires (C-Pipes) such as serial links, E1/T1 circuits, G.703, C37.94, FXS/FXO, E&M, and other legacy interfaces.

Key group encryption may also support any-to-any group based encryption for VPRN based services. VPRNs can also make use of SDPs for providing connectivity of services between PE routers. Some embodiments may use a convenient method of binding Layer 3 VPRN services to LSPs or GRE tunnels based on the reachability of other routers in the VPRN advertised in mp-BGP. To encrypt the traffic in a VPRN using key group encryption, the service manager 105 simply configures a particular key-group for the VPRN, and all nodes in the VPRN then download the key-group information needed to enable key group encryption. After all the key-groups have been downloaded and verified, each node is capable of encrypting and decrypting traffic in the VPRN using the keys in the associated key-group. The service manager 105 then enables key group encryption on each node as required until all nodes in the VPRN have key group encryption enabled for the VPRN.

Figure 8:
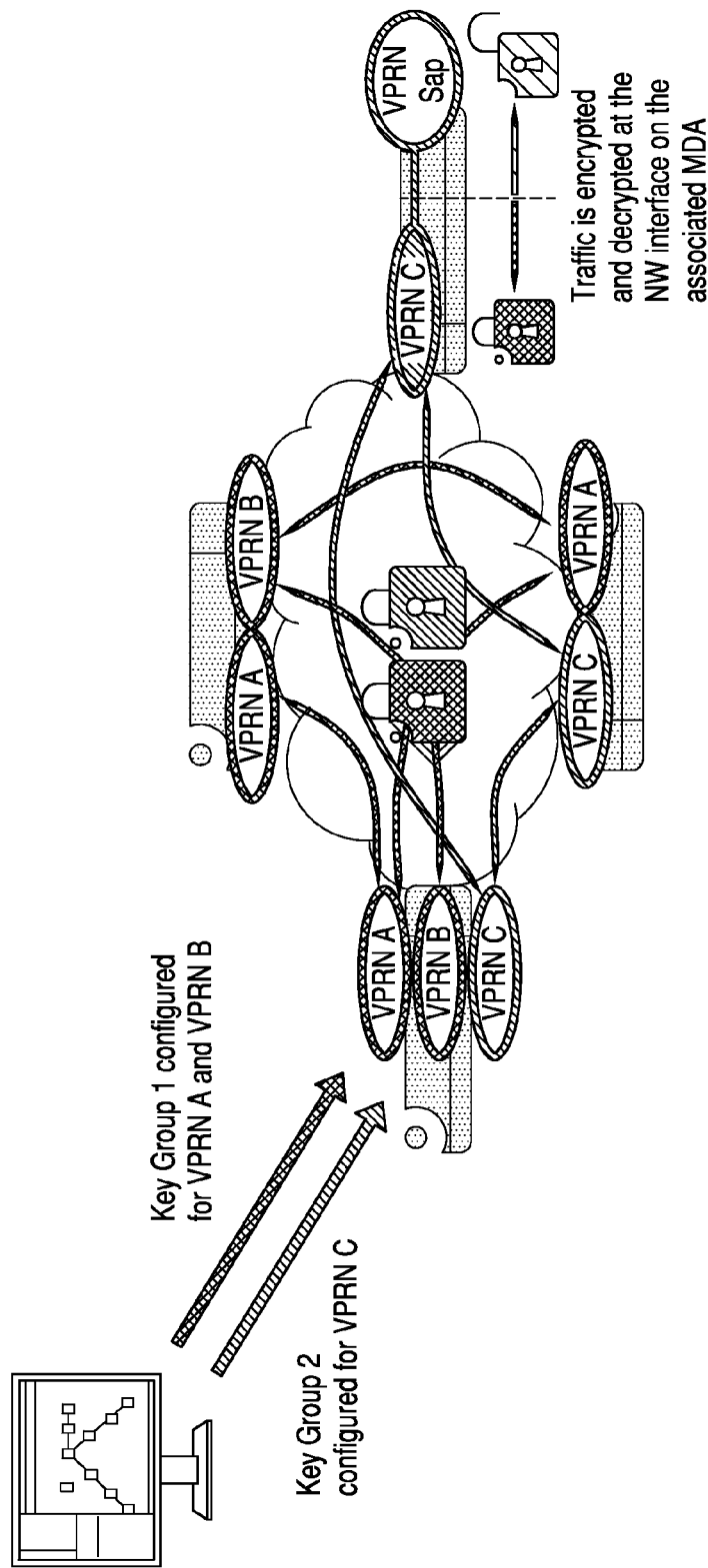
FIG. 8 illustrates MPLS Based VPRN Service Level Encryption embodiment.

FIG. 8 illustrates MPLS Based VPRN Service Level Encryption embodiment 800. In embodiment 800, the same key group may be used for multiple VPRNs. VPRN(A) and VPRN(B) are using key-group 1 and VPRN(C) is using key-group 2. In the embodiment, there may be no need to establish PE-PE security tunnels or meshes of security tunnels as the group keys are downloaded by the nodes participating in the VPRN and can safely encrypt traffic sent to any other node in the VPRN without worry of it not being able to pass.

VPRNs may also be configured to use L3 spoke-SDPs. A L3 spoke-SDP may be used to specifically assign MPLS tunnels to VPRN services without having the system choose the tunnels automatically as is the case when using the auto-binding function. This may be convenient for connecting other routers into the VPRN that are not key group encryption capable or aware. This may allow interworking and extending services in the same VPRN to outside the key group encryption domain as might be needed. Since this combination of auto-binding and L3 spoke-SDP configuration is possible for added flexibility, key group encryption provides simple rules for how to configure this combination of encrypted and unencrypted service within the same VPRN.

Figure 9:
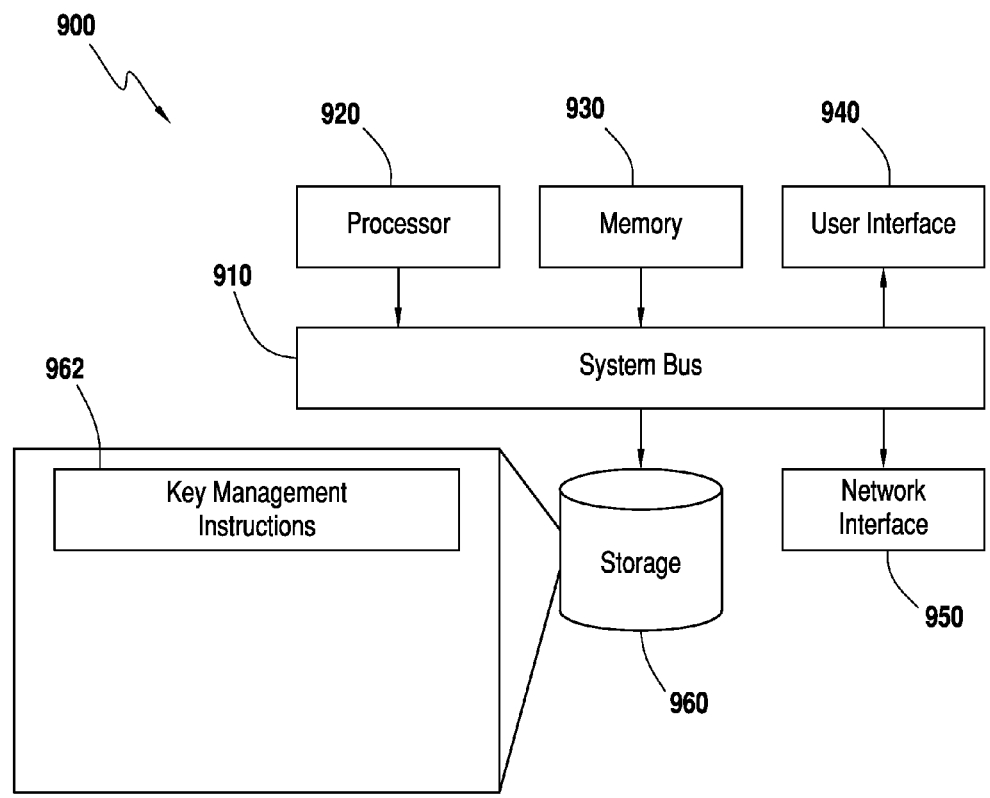
FIG. 9 illustrates an example of a hardware system.

FIG. 9 illustrates an example of a hardware system 900 for implementing the coding and communication schemes described herein. The hardware system 900 may correspond to virtually any device that may participate in the key group management or utilization such as, for example, a laptop, mobile communications device, server, blade, node, transmitter, receiver, or other device.

As shown, the device 900 includes a processor 920, memory 930, user interface 940, network interface 950, and storage 960 interconnected via one or more system buses 910. It will be understood that FIG. 9 constitutes, in some respects, an abstraction and that the actual organization of the components of the device 900 may be more complex than illustrated.

The processor 920 may be any hardware device capable of executing instructions stored in the memory 930 or the storage 960. As such, the processor may include a microprocessor, field programmable gate array (FPGA), application-specific integrated circuit (ASIC), or other similar devices.

The memory 930 may include various memories such as, for example L6, L2, or L3 cache or system memory. As such, the memory 930 may include static random access memory (SRAM), dynamic RAM (DRAM), flash memory, read only memory (ROM), or other similar memory devices.

The user interface 940 may include one or more devices for enabling communication with a user such as an administrator. For example, the user interface 940 may include a display, a mouse, and a keyboard for receiving user commands. In some embodiments, the user interface 940 may include a command line interface or graphical user interface that may be presented to a remote device via the network interface 950.

The network interface 950 may include one or more devices for enabling communication with other hardware devices. For example, the network interface 950 may include a network interface card (NIC) configured to communicate according to the Ethernet protocol. Additionally, the network interface 950 may implement a TCP/IP stack for communication according to the TCP/IP protocols, for example. Various alternative or additional hardware or configurations for the network interface 950 will be apparent.

The storage 960 may include one or more machine-readable storage media such as read-only memory (ROM), random-access memory (RAM), magnetic disk storage media, optical storage media, flash-memory devices, or similar storage media. In various embodiments, the storage 960 may store instructions for execution by the processor 920 or data upon which the processor 920 may operate.

It will be apparent that various information described as stored in the storage 960, may be additionally or alternatively stored in the memory 930. In this respect, the memory 930 may also be considered to constitute a "storage device" and the storage 960 may be considered a "memory." Various other arrangements will be apparent. Further, the memory 930 and storage 960 may both be considered to be "non-transitory machine-readable media." As used herein, the term "non-transitory" will be understood to exclude transitory signals but to include all forms of storage, including both volatile and non-volatile memories.

In some embodiments, storage 960 may contain key management instructions 962, for example. Key management instructions may include instructions related to transmitting and/or receiving keys to nodes in a key group. The instructions may be related to the relevant protocol used to transmit or receive. The instructions may similarly be related to management of receipt of keys and communication with connected nodes.

While the hardware device 900 is shown as including one of each described component, the various components may be duplicated in various embodiments. For example, the processor 920 may include multiple microprocessors that are configured to independently execute the methods described herein or are configured to perform steps or subroutines of the methods described herein such that the multiple processors cooperate to achieve the functionality described herein. Various additional arrangements will be apparent.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor may be explicitly shown.

Although the various embodiments have been described in detail with particular reference to certain aspects thereof, it should be understood that the invention may be capable of other embodiments and its details are capable of modifications in various obvious respects. As may be readily apparent to those skilled in the art, variations and modifications may be affected while remaining within the spirit and scope of the invention. Accordingly, the foregoing disclosure, description, and figures are for illustrative purposes only and do not in any way limit the invention, which may be defined only by the claims.

What is claimed is:

1. A method performed by a node on a network for managing a group of devices in communication with each other and sharing a set of keys, the method comprising:
   measuring a load on each of two devices from the group;
   opening a secure channel with each of the two devices from the group based on the load;
   providing the set of keys to the two devices from the group, wherein the set of keys include an encryption and an authentication key;
   indicating to the two devices to begin using the set of keys,
   determining which one of a plurality of key management actions to perform,
   performing an audit process, which is one of the plurality of key management actions, including verifying, using a checksum, that nodes within the key group have the same copy of encryption and authentication keys; and
   determining whether to perform a different one of the plurality of key management actions.

2. The method of claim 1 further comprising:
   performing the auditing process at an interval set by an automatic timer.

3. The method of claim 1 further comprising:
   performing the auditing process according to a schedule set by a user via an interface.

4. The method of claim 1 further comprising:
   when a node is non-responsive:
      ensuring all nodes in a key group of which said unresponsive node is a member have the correct keys, after the node becomes responsive.

5. The method of claim 1 further comprising:
   when the network is down:
      ensuring devices in the associated key group have correct keys once the network is back up and running.

6. The method of claim 1 further comprising:
   performing synchronization procedures including detecting when a key group is modified inside one of the devices.

7. A device for managing a key group, the device comprising:
   a memory;
   a processor in communication with the memory, the processor configured to:
      measure a load on each of two devices from the group;
      open a secure channel with each of the two devices from the group based on the load;
      provide the set of keys to the two devices from the group, wherein the set of keys include an encryption and an authentication key;
      indicate to the two devices to begin using the set of keys; and
      determine which one of a plurality of key management actions to perform,
      perform an audit process, which is one of the plurality of key management actions, including verifying, using a checksum, that nodes within the key group have the same copy of encryption and authentication keys; and
      determine whether to perform a different one of the plurality of key management actions.

8. The device of claim 7, wherein the processor is further configured to:
   perform the audit process at an interval set by an automatic timer.

9. The device of claim 7, wherein the processor is further configured to:
   perform the audit process according to a schedule set by a user via an interface.

10. The device of claim 7, wherein the processor is further configured to:
    when a node is non-responsive:
       ensure all nodes in a key group of which said unresponsive node is a member have the correct keys, after the node becomes responsive.

11. The device of claim 7, wherein the processor is further configured to:
    when the network is down:
       ensure devices in the associated key group have correct keys once the network is back up and running.

12. The device of claim 7, wherein the processor is further configured to:
    perform synchronization procedures including detecting when a key group is modified inside one of the devices.

13. A method performed by a node on a network for managing a group of devices in communication with each other and sharing a set of keys, the method comprising:
    measuring a load on each of two devices from the group;
    opening a secure channel with each of the two devices from the group based on the load;
    providing the set of keys to the two devices from the group, wherein the set of keys include an encryption and an authentication key;
    indicating to the two devices to begin using the set of keys;
    determining which one of a plurality of key management actions to perform;
    performing synchronization procedures including detecting when a key group is modified inside one of the devices and resolving any discrepancy detected when the key group is modified inside one of the devices, and
    determine whether to perform a different one of the plurality of key management actions.

14. The method of claim 13, further comprising:
    when a node is non-responsive:
       ensuring all nodes in a key group of which said unresponsive node is a member have the correct keys, after the node becomes responsive.

15. The method of claim 13, further comprising:
    when the network is down:
       ensuring devices in the associated key group have correct keys once the network is back up and running.

16. The method of claim 13, further comprising:
    ensuring that nodes in the key group can communicate with nodes outside of the key group without using encryption.

17. A device for managing a key group, the device comprising:

a memory;
a processor in communication with the memory, the processor configured to:
measure a load on each of two devices from the group;
open a secure channel with each of the two devices from the group based on the load;
provide the set of keys to the two devices from the group, wherein the set of keys include an encryption and an authentication key;
indicate to the two devices to begin using the set of keys;
determine which one of a plurality of key management actions to perform;
perform synchronization procedures including detecting when a key group is modified inside one of the devices and resolving any discrepancy detected when the key group is modified inside one of the devices;
determine whether to perform a different one of the plurality of key management actions.

18. The device of claim 17, wherein the processor is further configured to:
when a node is non-responsive:
ensure all nodes in a key group of which said unresponsive node is a member have the correct keys, after the node becomes responsive.

19. The device of claim 17, wherein the processor is further configured to:
when the network is down:
ensure devices in the associated key group have correct keys once the network is back up and running.

20. The device of claim 17, wherein the processor is further configured to:
ensure that nodes in the key group can communicate with nodes outside of the key group without using encryption.

* * * * *